United States Patent [19]

Aramaki et al.

[11] 3,962,875
[45] June 15, 1976

[54] OIL FENCE HAVING A LIMITED FLEXIBILITY

[75] Inventors: Kuninori Aramaki; Yasuharu Kawaguchi, both of Yokohama; Hiroshi Kawakami, Kamakura, all of Japan

[73] Assignee: Bridgestone Tire Company Limited, Tokyo, Japan

[22] Filed: Oct. 23, 1974

[21] Appl. No.: 517,576

Related U.S. Application Data

[63] Continuation of Ser. No. 373,222, June 25, 1973, Pat. No. 3,867,817.

[30] Foreign Application Priority Data

June 29, 1972 Japan............................ 47-64431

[52] U.S. Cl.................................................. 61/1 F
[51] Int. Cl.²........................................ E02B 15/04
[58] Field of Search.............. 16/150; 61/1 F, 5; 210/242, DIG. 21

[56] References Cited

UNITED STATES PATENTS

| 436,644 | 9/1890 | White | 61/5 |
| 3,592,005 | 7/1971 | Greenwood | 61/1 F |
| 3,640,033 | 12/1971 | Tuttle | 61/1 F |
| 3,651,647 | 3/1972 | Flaviani | 61/1 F |
| 3,751,925 | 8/1973 | Thurman | 61/1 F |
| 3,867,817 | 2/1975 | Aramaki | 61/1 F |

FOREIGN PATENTS OR APPLICATIONS

| 1,007,683 | 10/1965 | United Kingdom | 16/150 |

*Primary Examiner*—Robert L. Wolfe
*Assistant Examiner*—David H. Corbin
*Attorney, Agent, or Firm*—Sughrue, Rothwell, Mion, Zinn & Macpeak

[57] ABSTRACT

An oil fence having a unidirectional flexibility, comprising a plurality of rigid floats which are swingably connected by hinge means. Planar skirts are connected to the floats so as to define at least one continuous oil fence wall thereby.

2 Claims, 10 Drawing Figures

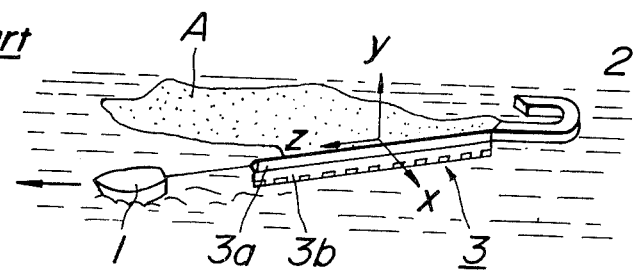
FIG_1 Prior art
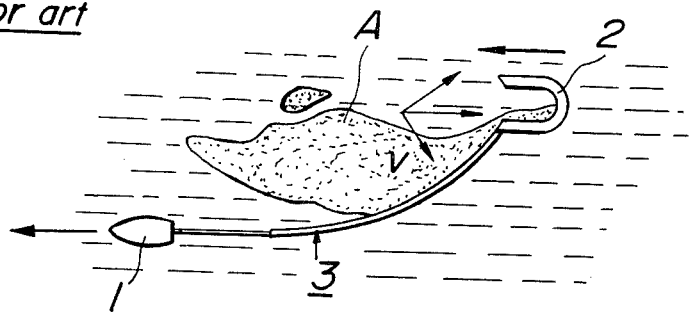
FIG_2 Prior art
FIG_3
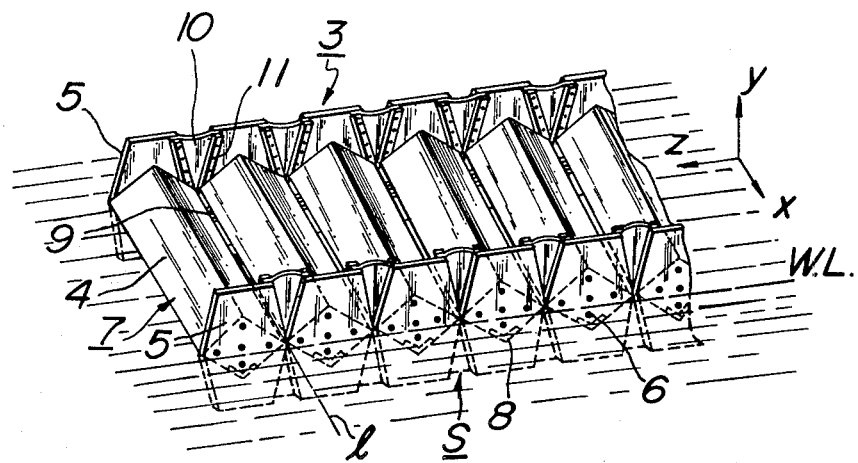

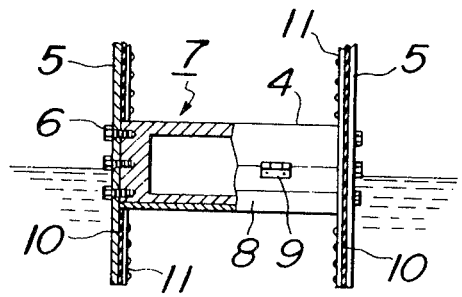
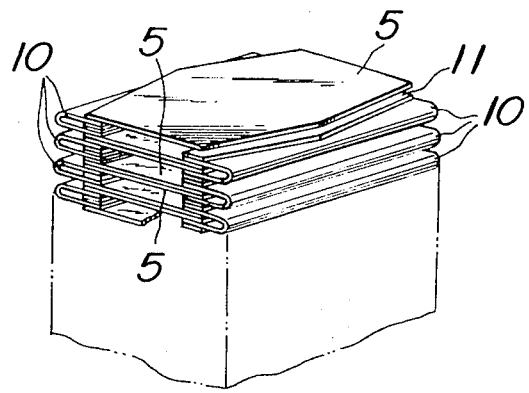
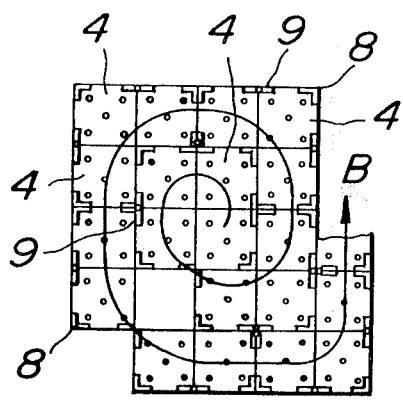
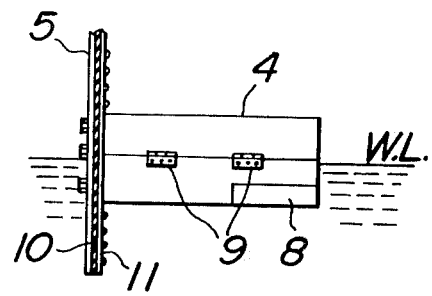

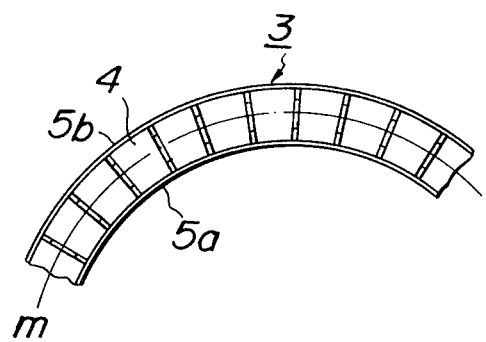
FIG_8

FIG_9A
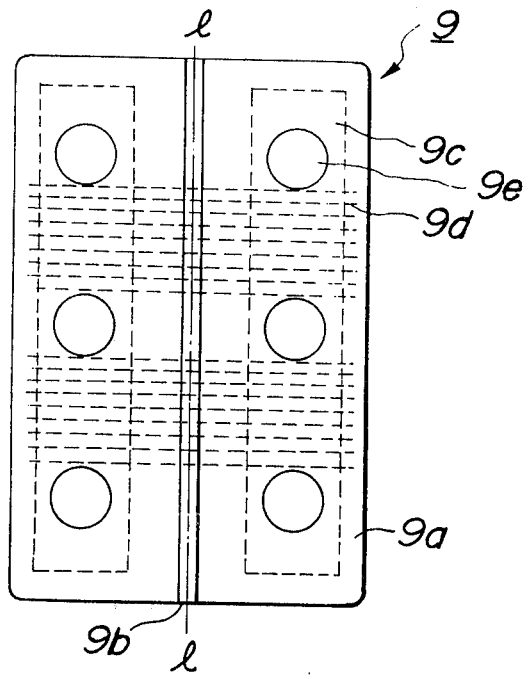
FIG_9B
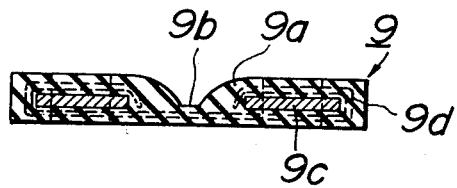

OIL FENCE HAVING A LIMITED FLEXIBILITY

This is a Continuation, of application Ser. No. 373,222 filed June 25, 1973, now U.S. Pat. No. 3,867,817.

BACKGROUND OF THE INVENTION

1. Field of the Invention

This invention relates to an oil fence having a limited flexibility, and more particularly to an oil fence having a limited flexibility which is to be pulled by a ship for recovering pollutants, e.g., spilt oil, from water surface.

2. Description of the Prior Art

To recover spilt oil or other pollutants from water surface, an oil fence having a long belt member which is flexible in three-dimensional directions has been used. The three-dimensionally flexible belt member, however, has a shortcoming in that it may turn from a vertical posture to a horizontal posture so that the pollutants might pass across the horizontal belt member. Thus, the flexible belt member fails to fulfill the desired object of collecting the pollutants.

Furthermore, the three-dimensionally flexible belt member allows the pollutant-carrying water to flow in a direction which is substantially perpendicular to the cruising direction of the ship pulling the belt member. The line of the long belt member is, of course, arcuately curved on the water surface when such perpendicular flow of the pollutant-carrying water is allowed. It has been found that when the flow rate of the pollutant-carrying water, relative to the longitudinal direction of the belt member, exceeds a certain value, the pollutants tend to by-pass the belt member by flowing underneath it together with the water. Such by-pass of the pollutants across the belt member is apparently detrimental to effective collection of the pollutants.

Therefore, an object of the present invention is to overcome the aforesaid difficulties of the conventional oil fence, by providing an improved oil fence which has a limited flexibility.

Summary of the Invention

According to the present invention, there is provided an oil fence having a limited flexibility, which comprises a plurality of oil fence units, each consisting of a hollow rigid float and at least one rigid planar skirt secured to the rigid float, a plurality of hinge means each connecting the adjacent oil fence units in such a manner that the adjacent oil fence units can swing relative to each other about an axis inherent to the hinge means and that the skirts of the oil fence units form an elongated oil fence wall extending at right angles to said axis of the hinge means, and a plurality of flexible membrane members each being disposed between the adjacent planar skirts and secured thereto.

BRIEF DESCRIPTION OF THE DRAWING

For a better understanding of the invention, reference is made to the accompanying drawing, in which:

FIG. 1 is a schematic perspective view of a conventional oil fence which is incorporated in an oil recovering system;

FIG. 2 is a schematic plan view of the system;

FIG. 3 is a partial perspective view of an oil fence, according to the present invention;

FIG. 4 is a partially cutaway elevation of an oil fence unit, which is to be used in the oil fence of FIG. 3;

FIG. 5 is a schematic perspective view of the manner in which a plurality of flexible membranes are folded, which flexible membranes are to be disposed between skirts of the adjacent oil fence units of FIG. 4;

FIG. 6 is a schematic diagram, showing the manner in which hollow floats of the oil fence units are rolled up in a compact fashion when they are not used;

FIG. 7 is an elevation, showing a modification of the oil fence unit of FIG. 4;

FIG. 8 is a partial plan view of an oil fence, according to the present invention; and FIGS. 9A and 9B are a plan view and a sectional view, respectively, of a hinge means to be used in the oil fence of the present invention for swingably joining adjacent oil fence units.

Like parts are designated by like numerals and symbols throughout the different figures of the drawing.

DESCRIPTION OF THE PREFERRED EMBODIMENTS

With a conventional pollutant recovery system, as illustrated in FIG. 1, a pollutant collecting unit 2 is pulled by one or two ships 1 (only one ship is shown) while dragging one or two lines of oil fences 3 (only one line is shown), which oil fence line is disposed between the ship 1 and the collecting unit 2. The line of oil fence 3 is to guide a layer of floating matter A, e.g., spilt oil, toward the collecting unit 2, in response to the cruising of the ship 1. To allow flexure along the contour of water surface, a conventional oil fence is provided with high flexibility in three mutually orthogonal directions X, Y, and Z, as shown in FIG. 1. A typical construction of such conventional oil fence comprises a hollow flexible tubular float 3a and a flexible skirt 3b depending therefrom.

The oil fence 3 of FIG. 1 has a shortcoming in that, as the cruising speed of the ship 1 increases, the oil fence 3 tends to be partially submerged in the water. The flexible skirt 3b is sometimes turned up as it moves through the water. The submerging of the oil fence 3 and the turning up of the flexible skirt 3b allow the floating matter A to by-pass the oil fence line. When this happens, the oil fence 3 fails to fulfill its function of guiding the floating matter A to the collecting unit 2.

Referring to the plan view of FIG. 2, if the collecting unit 2 should move toward the ship 1, due to some reason or other, the oil fence line 3 flexes substantially on a horizontal plane ZX. The arcuate flexure of the oil fence 3 may also be caused when water flow on the water surface has a component $v$ which is normal to the arcuate line of the oil fence 3. The inventors have found out that, if the component $v$ of the water velocity exceeds 1.8 Km/hr., the floating matter A (e.g., spilt oil) may be pulled by the water flow and tends to by-pass the oil fence through a path thereunder. Thus, any oil fence which is flexible on a horizontal plane, i.e., the XZ plane of FIG. 1, is susceptible to such by-pass phenomenon.

Therefore, an object of the present invention is to provide an oil fence whose flexibility is substantially restricted to that on a vertical plane.

Referring to FIGS. 3 and 4, illustrating an embodiment of the oil fence according to the present invention, the oil fence is formed by connecting a plurality of oil fence units 7. Each unit 7 has a hollow prism-shaped float 4 and at least one planar skirt 5 secured to a base surface of the prism-shaped float by bolts 6 in a detachable manner. The hollow float 4 is made of a material having a high rigidity, such as iron sheet, fiber-reinforced synthetic resin sheet, wood board, and the like. According to the present invention, the float shape is not restricted to the hollow prism, and any other suitable shape can be used as long as it provides a sufficient buoyancy to the oil fence. For instance, the float can be made of hard foamed plastics material in any desired shape. The skirt 5 is made of rigid sheet material, such as aluminum sheet, iron sheet, fiber-reinforced synthetic resin sheet, or the like. preferably, two planar skirts 5 are used in each unit 7, one at each of the opposing ends of the prism-shaped float 4, as shown in FIG. 4.

The buoyancy of each oil fence unit 7 is preferably so selected that, when it is placed in water, the longitudinal center line of the prism-shaped float 4 lies substantially on the plane of the water surface. To this end, a suitable weight member 8 may be attached to the float 4. In FIG. 4, the weight member 8 is an angled steel member which is attached along the bottom edge of the prism-shaped float 4.

In assembling the units 7 into an oil fence, the floats 4 are juxtaposed in such a manner that the planar skirts 5 which are secured to one ends of the units 7 lie substantially on a common plane. More particularly, when each unit 7 has two planar skirts 5 secured to the opposite ends thereof, such skirts 5 of the assembled units 7 define two parallel planes extending along the opposite ends of the floats 4. The adjacent floats 4 in the oil fence 3 are connected by one or more hinge means 9 in such a manner that the adjacent floats 4 can swing relative to each other about a hinge line $l$ which is substantially perpendicular to the plane of the skirts 5. On the other hand, the relative movement of the adjacent floats 4 in parallel to the aforesaid hinge line $l$ is restricted by the hinge means 9.

FIGS. 9A and 9B illustrate an embodiment of the hinge means 9 for swingably connecting the adjacent floats 4. A pair of spaced parallel core metal plates 9c are embedded in a unitary elastomeric hinge body 9a. A recess 9b is formed in the elastomeric body 9a in parallel with the core metal plates 9c, so as to define a hinge line $l$—$l$, about which the adjacent floats 4 may swing. A suitable number of bolt holes 9e are bored through the hinge means 9, i.e., through both the elastomeric body 9a and the core metal plates 9c. Preferably, suitable reinforcing cords 9d, e.g., glass fiber cords, are embedded in the elastomeric body 9a, so as to wrap the two core metal plates, as shown in the figures. The merit of the hinge means of FIGS. 9A and 9B is in its capability of absorbing mutual vibrations between the adjacent floats 4. The hinge means 9 is, of course, connected to the adjacent floats 4 by bolts and nuts (not shown). The present invention is, however, not restricted to such hinge means as shown in FIGS. 9A and 9B. Conventional metallic hinges (now shown) of simple construction can be used for swingably connecting the floats 4.

In the embodiment, as shown in FIGS. 3 and 4, the adjacent oil fence units 7 are swingably connected by joining the floats 4 with the hinge means 9, so as to allow the oil fence line 3 to flex in the plane YZ of the three-dimensional orthogonal co-ordinate system of the FIG. 3. With the present invention, the adjacent units 7 may be connected by joining the skirts 5, instead of the floats 4.

To allow the relative swinging of the adjacent oil fence units 7, a suitable spacing S should be provided between the skirts 5 of the units 7, as shown in FIG. 3. To close such gap S against leakage of the floating matter A, e.g., spilt oil, a flexible membrane 10 is attached to the adjacent skirts 5 by fixtures 11. The flexible membrane 10 may be made of a rubber coated cloth or a water-repellent asbestos cloth. Thus, a continuous wall is formed on the water surface by the skirts 5 and the flexible membranes 10, which wall inhibits the floating matter A from moving thereacross.

In operation, the oil fence 3 of FIG. 3 is pulled in the direction of the Z axis of the three-dimensional orthogonal co-ordinate system of FIG. 3 by a ship 1 for collecting or recovering the floating matter A, as shown in FIGS. 1 and 2. In this case, the oil fence 3 can flex on the YZ plane, so as to follow any variation of the wave contour on the water surface. On the other hand, the oil fence line 3 is restricted from flexing on the XZ plane. Thereby, the oil fence line 3 prevents the floating matter A from moving in a direction normal to the line of the oil fence. Thus, undesirable leakage of the floating matter A across the oil fence 3 can be effectively prevented For traction of the oil fence 3 by the ship 1, a rope (not shown) may be connected between the ship and the foremost oil fence unit 7, or such rope may be extended through the entire length of the oil fence 3.

The oil fence 3 of the present invention is also easy to transport and requires only a small floor space for storage. More particularly, when the oil fence is not used, the skirts 5 and the membranes 10 are separated from the floats 4 by releasing the bolts 6, while keeping the floats 4 joined by the hinge means 9. The skirts 5 and the membranes 10 thus separated can be folded in a compact fashion, because the membranes 10 are flexible. FIG. 5 illustrates a typical way of such folding. The floats 4 can be rolled by using the hinge means 9, as shown by the spiral line B of FIG. 6.

FIG. 7 illustrates an oil fence unit 7, which has a skirt 5 secured to only one end of a float 4 thereof. In this case, to keep the longitudinal central axis of the float 4 horizontal, a weight member 8 is secured to the float 4 at the opposite end of the float 4 to said skirt 5.

The oil fence according to the present invention can also be applied to a stationary installation. FIG. 8 illustrates a bent oil fence 3, which may be incorporated in a stationary installation. The structure of the bent oil fence 3 is essentially the same as that of linear oil fence of FIG. 3, except the following two points: namely, individual floats 4 are suitably tapered, and a planar skirt 5b at one end of the float 4 is differently sized from a planar skirt 5a at the opposite end of the float 4. More particularly, when the oil fence 3 is to be formed along a curved line $m$, the cross sectional area of the float 4, taken at right angles to the longitudinal central axis thereof, gradually diminishes as the float extends toward the center of curvature (not shown) of the curved line $m$. The planar skirt 5a at that end of the float 4 which is located closer to the center of the curvature (not shown) of the curved line $m$ than the opposite end thereof is smaller than the planar skirt 5 at said opposite end thereof.

The oil fence 3 along the curved line $m$, as shown in FIG. 8, also flex along the contour of a waved water surface, while keeping the skirts 5 and the membranes 10 vertical without flexing in a direction normal to the curve $m$. Thereby, excellent performance of preventing the dispersion of the floating matter A can be achieved.

We claim:

1. An oil fence having a limited flexibility in the transverse direction, said oil fence comprising:
   a. at least three rigid floats arranged side by side in the longitudinal direction of the fence;
   b. a rigid planar skirt attached to a first end of each of said rigid floats along the longitudinal direction of the fence, each of said first ends of said rigid floats being adjacent the first ends of the adjacent floats, said rigid planar skirts being dimensioned to leave a gap between each adjacent pair of rigid planr skirts in the longitudinal direction of the fence, and no skirt being attached to the end of each of said rigid floats opposite the first end;
   c. a flexible membrane attached to each adjacent pair of said rigid planar skirts to close the gap therebetween, whereby said rigid planar skirts and said flexible membranes attached to said rigid floats will form a continuous wall capable of inhibiting floating matter from moving thereacross; and
   d. hinge means for pivotally connecting each pair of adjacent floats, each of said hinge means comprising a pair of core metal plates, each of which is connected to one of said adjacent floats adjacent to the hinge axis, reinforcing cords wound around said metal plates and crossing the hinge axis transversely thereto, and a vibration-absorbing elastomeric body surrounding said metal plates and said reinforcing cord, said hinge means being rigid so as to permit relative rotational motion about the hinge axis but to substantially prevent relative rotational motion about axes perpendicular to the hinge axis, whereby each pair of adjacent floats is swingable about an axis therebetween which is substantially perpendicular to the longitudinal direction of the fence, permitting the fence to follow any variation of the wave contour on the water surface, but the fence is restricted from flexing in the longitudinal direction of the fence.

2. An oil fence according to claim 1 wherein each of the floats is of prism shape.

* * * * *